US011157657B2

(12) United States Patent
Rose et al.

(10) Patent No.: US 11,157,657 B2
(45) Date of Patent: Oct. 26, 2021

(54) MIXED DATA FINGERPRINTING WITH PRINCIPAL COMPONENTS ANALYSIS

(71) Applicant: LiveRamp, Inc., San Francisco, CA (US)

(72) Inventors: Martin Rose, Superior, CO (US); Christina Tsz Ling Leung, San Mateo, CA (US)

(73) Assignee: LiveRamp, Inc., San Francisco, CA (US)

( * ) Notice: Subject to any disclaimer, the term of this patent is extended or adjusted under 35 U.S.C. 154(b) by 262 days.

(21) Appl. No.: 16/472,295

(22) PCT Filed: Nov. 20, 2017

(86) PCT No.: PCT/US2017/062612
§ 371 (c)(1),
(2) Date: Jun. 21, 2019

(87) PCT Pub. No.: WO2018/118314
PCT Pub. Date: Jun. 28, 2018

(65) Prior Publication Data
US 2019/0377905 A1 Dec. 12, 2019

Related U.S. Application Data

(60) Provisional application No. 62/438,291, filed on Dec. 22, 2016.

(51) Int. Cl.
*G06F 21/16* (2013.01)
*G06F 21/62* (2013.01)
(Continued)

(52) U.S. Cl.
CPC ............. *G06F 21/64* (2013.01); *G06F 21/16* (2013.01); *G06F 16/17* (2019.01); *G06F 16/41* (2019.01);
(Continued)

(58) Field of Classification Search
CPC .......... G06F 21/00; G06F 21/16; G06F 21/62; G06F 21/64; G06F 21/552; G06F 21/577;
(Continued)

(56) References Cited

U.S. PATENT DOCUMENTS 10,373,078 B1\* 8/2019 Agarwal ................ G06N 20/00
2004/0111220 A1\* 6/2004 Ochs ....................... G06K 9/624
702/19
(Continued)

FOREIGN PATENT DOCUMENTS

WO WO-2012138004 A1 \* 8/2012 ............... G06K 9/46

OTHER PUBLICATIONS

Sparse Signal Decomposition Techniques for Multimedia Fingerprinting by Xiaoli Li (B.Eng. in Electrical Engineering, P.R. China, 1996) pp. 166; Dated: (Year: 2011).\*
(Continued)

*Primary Examiner* — Samson B Lemma
*Assistant Examiner* — Ali H. Cheema

(57) ABSTRACT

Principal components analysis is applied to data sets to fingerprint the dataset or to compare the dataset to a "wild file" that may have been constructed from data found in the dataset. Principal components analysis allows for the reduction of data used for comparison down to a parsimonious compressed signature of a dataset. Datasets with different patterns among the variables will have different patterns of principal components. The principal components of variables (or a relevant subset thereof) in a wild file may be computed and statistically compared to the principal components of identical variables in a data provider's reference file to provide a score. This constitutes a unique and compressed signature of a file that can be used for identification and comparison with similarly defined patterns from other files.

18 Claims, 7 Drawing Sheets

(51) Int. Cl.
*G06F 21/64* (2013.01)
*G06F 17/16* (2006.01)
*G06F 17/17* (2006.01)
G06F 16/68 (2019.01)
G06F 21/55 (2013.01)
G06F 21/57 (2013.01)
G06F 16/41 (2019.01)
G06F 16/17 (2019.01)
G06F 16/61 (2019.01)
G06F 17/12 (2006.01)

(52) U.S. Cl.
CPC .............. *G06F 16/61* (2019.01); *G06F 16/68* (2019.01); *G06F 17/12* (2013.01); *G06F 17/16* (2013.01); *G06F 21/552* (2013.01); *G06F 21/577* (2013.01); *G06F 21/62* (2013.01); *G06F 2221/074* (2013.01)

(58) Field of Classification Search
CPC .......... G06F 17/12; G06F 17/16; G06F 16/17; G06F 16/61; G06F 16/68; G06F 16/41; G06F 16/211; G06F 16/245; G06F 16/248; G06F 16/285; G06F 16/21; G06F 2221/074; G06K 9/6244; G06K 9/6247; G06K 9/6253; G06K 9/00536; H04L 9/3247; H04L 63/1416; H04L 9/32; H04N 21/84; H04N 21/42; H04N 21/4722; G06N 20/00
USPC ...... 726/23; 702/19, 179; 382/100, 118, 225
See application file for complete search history.

(56) References Cited

U.S. PATENT DOCUMENTS

| | | | | |
|---|---|---|---|---|
| 2007/0041609 A1* | 2/2007 | Chung | .................. | G06T 7/0004 382/100 |
| 2007/0168154 A1* | 7/2007 | Ericson | ................ | G06K 9/6247 702/179 |
| 2008/0031498 A1* | 2/2008 | Corcoran | ............. | G06K 9/6247 382/118 |
| 2009/0060266 A1* | 3/2009 | Sornborger | .......... | G06K 9/0014 382/100 |
| 2012/0321204 A1* | 12/2012 | Fertik | .................. | G06K 9/6247 382/225 |
| 2013/0339202 A1* | 12/2013 | Zhao | ...................... | G06Q 30/04 705/34 |
| 2015/0317475 A1* | 11/2015 | Gonzalez | ................ | G06F 21/55 726/23 |
| 2015/0341376 A1* | 11/2015 | Nandy | ................ | H04L 63/1408 726/23 |
| 2017/0104657 A1* | 4/2017 | Gopalakrishnan | ..... | G06K 9/622 |
| 2018/0018590 A1* | 1/2018 | Szeto | .................. | G06F 21/6254 |

OTHER PUBLICATIONS

Detecting data semantic: A data leakage prevention approach by Sultan Alneyadi, Elankayer Sithirasenan, Vallipuram Muthukkumarasamy pp. 8; IEEE (Year: 2015).*
A PCA-based Similarity Measure for Multivariate Time Series by Kiyoung Yang and Cyrus Shahabi pp. 10; Dated Nov. 13, 2004.*
Watermarking security: theory and practice by Teddy Furon, Francois Cayre, Caroline Fontaine pp. 34; Submitted on July 28, 2006.*
Principal component analysis: a review and recent developments by Ian T. Jolliffe and Jorge Cadima pp. 17; Accepted Jan. 19 (Year: 2016).*
Implementing a Principal Component Analysis (PCA)—in Python, step by step by Sebastian Taschka pp. 19; Apr. 13 (Year: 2014).*
A Fingerprint-based Access Control using Principal Component Analysis and Edge Detection by Ernande F. Melo and H. M. de Oliveira pp. 5; Dated (Year: 2015).*
Principal component analysis for data containing outliers and missing elements by Sven Serneels and Tim Verdonck pp. 16; dated: May 24 (Year: 2007).*
A principal components method to impute missing values for mixed data by Vincent Audigier, Francois Husson, and Julie Josse pp. 20; Feb. 19 (Year: 2013).*
On the performance overhead tradeoff of distributed principal component analysis via data partitioning by Ni An and Steven Weber (Department of Electrical and Computer Engineering, Drexel University, Philadelphia, PA 19104) pp. 6; Dec. 21 (Year: 2015).*
A Fingerprint Recognition Algorithm Based on Principal Component Analysis by Wang Yongxu, Ao Xinyu, Du Yuanfeng and Li Yongping pp. 4; IEEE (Year: 2006).*
Principle Components Analysis and Support Vector Machine based Intrusion Detection System by Heba F. Eid, Ashraf Darwish, Aboul Ella Hassanien, and Ajith Abraham p. 5; IEEE (Year: 2010).*

* cited by examiner

MIXED DATA FINGERPRINTING WITH PRINCIPAL COMPONENTS ANALYSIS

TECHNICAL FIELD

The field of the invention is data privacy, content-based zero-watermarking methods, and data authentication.

BACKGROUND ART

Intentional or unintentional leakage of proprietary data files (e.g., files of type .csv, .sql, .txt, and others) or textual data in JSON or XML data feeds represents a significant and potentially damaging source of corporate revenue loss. Existing solutions are available to mitigate against loss while data reside behind corporate firewalls. Solutions like the secure HTTP or SSL protocols mitigate the risk of loss when data, whether as a file or as a data feed, leaves the firewall and traverses the Internet to legitimate receptors (Trusted Third Parties, or TTPs). Other solutions exist to assert and document file ownership once they are being used outside the original source's (Data Owner's) firewall. These data watermarking and fingerprinting solutions are desirable because they provide evidence of ownership in cases of legal malfeasance. As previously noted, the existence of legal procedures for recovery of damages should act as a deterrent to Bad Actors who would appropriate and freely use this data for their own profit, including selling it to others.

Data watermarking and data fingerprinting constitute two categories of procedures for demonstrating data file ownership. These two approaches are not always mutually exclusive, but a general distinction obtains. File watermarking involves making changes to the data, normally minor, to create unique patterns that are difficult for a user to recognize. Altering the least significant digit of a numeric (continuous) variable according to a specified rule is a simple example. Creating a fingerprint of a data file does not involve alterations to the data; rather, characteristics of the data are used to create a signature that can be recognized after the fact. A simple fingerprint might be predicated on statistical characterization of variables in a file. A more sophisticated fingerprint might be based on a multi-variable analysis defining the covariance structure among the variables in a dataset that allow it to be discriminated from other files. Because a fingerprint is technically a subset or substitute of watermarking, fingerprint methods are also referred to as content-based, zero-watermark techniques. While they are based on content of the data file they do not involve any alteration of the data, hence the reference to "zero" watermark.

Data tables (row by column arrangements of text and numeric values), or their text feed equivalents, present a unique challenge for watermarking or fingerprinting compared to audio, video, still images, and even other text material such as books, journals, or like publications. At the simplest level, a few pixels in an image can be unrecognizably and subtly altered to create a watermark that constitutes a unique identifier. The file can therefore can be differentiated by the original watermark from other similarly slightly altered versions of the same image. Video and audio files offer even more opportunity for watermark insertion because of their great bit depth and repetitive nature. It is relatively easy to alter a few pixels in repeated frames of video, or even more imperceptibly and complexly modify the sequence of video frames to create a unique and recognizable watermark. Similar operations can be executed with audio files in both the time and frequency domain to imbed identifying watermarks or otherwise alter the signal in a way that is not perceptible to human hearing. In practice, only the watermark creator can identify it. There are a variety of techniques that can be used on books, journals and other text materials to produce unrecognizable watermarks, by the judicious use of spacing between words, alteration of style and syntax. These procedures have been previously and widely described in the literature.

Principal components analysis (PCA) and related techniques, such as independent component analysis and multi-dimensional scaling, have been applied to the biomedical analysis of human fingerprints in forensic and civilian applications. In fingerprint forensics the techniques are applied to well-accepted classes of fingerprint features arising from local ridge discontinuities, ridge endings and bifurcations. A principal components analysis approach to fingerprint analysis has been shown to give similar performance to original uncompressed data, but with reduced computations. These approaches have been used for both authentication and recognition.

Another major application of principal components analysis is in fingerprinting biological phenomena from a dataset of chemical composition. Examples include chemical signatures of various oil sources (e.g., oil tankers) and samples obtained from oil spills. These applications find the first several principal components of data obtained from GC-MS (gas chromatography-mass spectrometry) chromatograms, which allow for a fast and objective fingerprinting procedure that makes more comprehensive use of data, because the covariation among a large set of variables is condensed into a smaller set of orthogonal components. PCA has also been used to define microbial communities in swine manure, such as differences among slurries from maternity pig confinement and pigs confined for finishing. The findings suggest the application of PCA in combination with several other techniques can be used to accurately monitor different metabolically active populations.

In another example, PCA techniques have been applied to analyze chemical datasets produced from a liquid chromatography tandem mass spectrometer analysis of expensive liquor (e.g., tequila, vodka, whisky, rum, cognac, etc.). It was used to identify marker compounds (acids, sugars, and polyphenols) and differentiate among different samples. The objective was to use the marker compounds to authenticate liquors and identify fraudulent adulteration.

The common theme in all of these biomarker studies is that PCA is used to analyze datasets in order to achieve a compact, orthogonal, and parsimonious representation (signature) of the variability present. The compact data signatures of different datasets are then used in an investigative/forensic sense for comparative authentication and recognition purposes.

Another area of rich text data analytics focuses on authorship attribution supported by statistical or computational methods. These have been applied to electronic texts such as email, online forums, blogs, source code, literature and so on. Recent advances of the automated approaches to attributing authorship have been examined from both text representation and text classification standpoints. Style markers including lexical, character, syntactic, and semantic features are first examined, followed by application-specific attributes definable only in certain languages or text domains. Lexical and character features consider text as sequences of word-tokens or characters. Lexical features are generally more complex than character features. Syntactic and semantic features require deeper linguistic analysis. While various feature selection and extraction methods are examined, none of these techniques include the use of multivariate statistics for data reduction and orthogonalization purposes.

DISCLOSURE OF INVENTION

The present invention falls into the fingerprint category because it is content-based and involves no data alterations. Instead, it uses linear combinations of variables in a dataset, or a subset of relevant variables, to define the internal structure of the data and the dominant patterns of covariation present. These linear combinations of variables, called principal components or factors, represent a parsimonious compressed signature of a dataset. Datasets with different patterns among the variables will have different patterns of principal components. The principal components of variables (or a relevant subset thereof) in a leaked data subset, or "Wild File," can be computed and statistically compared to the principal components of identical variables in a data provider's reference file, or any reference file for that matter. This constitutes a unique and compressed signature of a file that can be used for identification and comparison with similarly defined patterns from other files.

The methodology applies PCA to data measured on different scales. First, variables and measurement scales are defined because they are fundamental to an understanding of the proposed approach. Then PCA is applied to variables measured on multiple scales, categorical and continuous, which represent the specific method used to fingerprint data files such as pertain to consumers and businesses. It may be understood then that the PCA approach is inherently resistant to common attack vectors used by those who steal data, such as data transformation and data transposition.

The application of PCA as presented in the various embodiments of the invention results in a vastly smaller set of data that must be compared when determining whether a particular Wild File is in fact leaked data from a Data Owner Dataset. This greatly reduces computational complexity. Because of the enormous size of the types of files that are typically employed, it is simply not practical to perform this comparison on entire files with any reasonably available computational resources. The problem stems from the facts that these files may have hundreds of millions of records, and each record may have more than a thousand fields; further, each Wild File may need to be compared to thousands of Data Owner Datasets to determine which, if any, represent a file from which the Wild File was leaked. Computation effort using conventional mechanisms, such as string matching, is thus extremely high, and requires extensive preprocessing to transform the data before the processing even begins. Performing these computations in the conventional manner is therefore impossible on standard computing equipment in an amount of time that is reasonable for a business, where the files are changing on a monthly basis, or even more often; the files would already be changing due to updates before the previous comparison runs were complete. On the other hand, the PCA approach generates statistical correlations for the selected principal components and the comparison is performed between the statistical values as opposed to comparing the values in each cell, resulting in dramatically reduced processing times. As a result, this PCA approach solves a problem that has been previously unsolvable in a practical business environment and provides a computationally efficient solution to the problem that can be implemented with standard business computing machinery.

These and other features, objects, and advantages of the present invention will become better understood from a consideration of the following detailed description of the various embodiments and appended claims in conjunction with the drawings as described following:

BEST MODE FOR CARRYING OUT THE INVENTION

Figure 1:
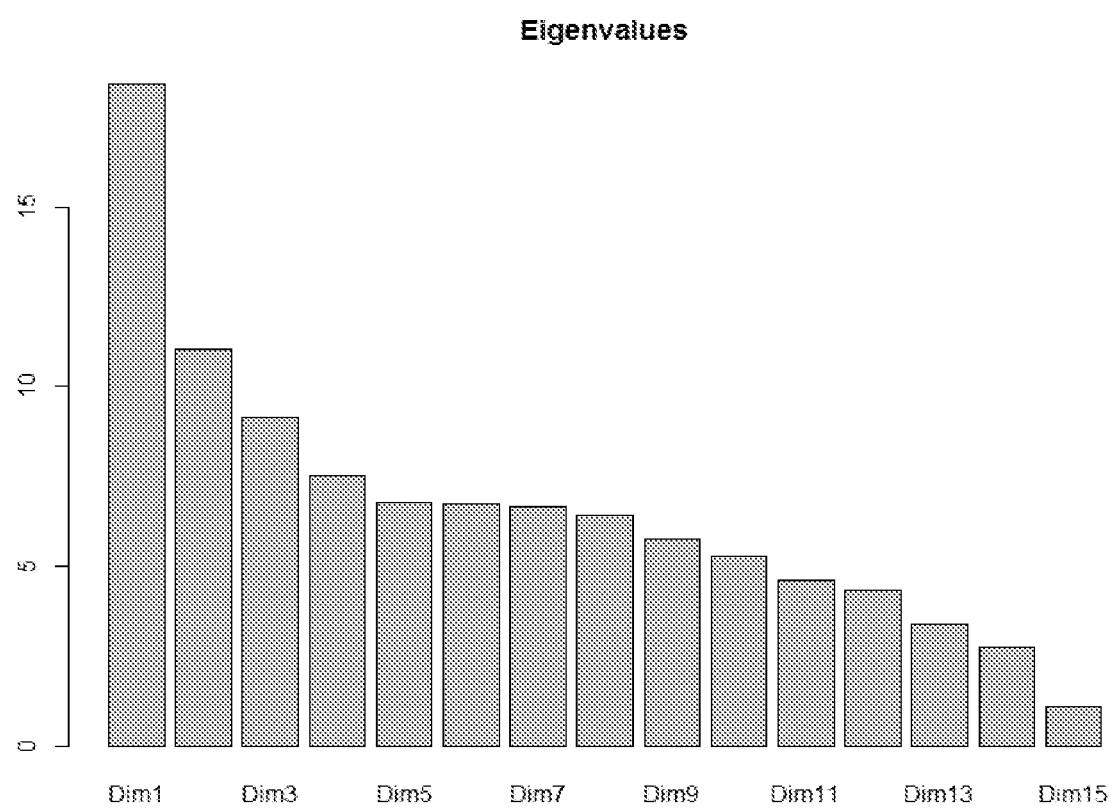
FIG. 1 is a bar graph depicting the amounts of variance accounted for by 15 principal components in a particular example according to an embodiment of the invention; the dimensions (principal components are shown on the x-axis, while the amount of variance explained by each is given on the y-axis.

Before the present invention is described in further detail, it should be understood that the invention is not limited to the particular embodiments and implementations described, and that the terms used in describing the particular embodiments and implementations are for the purpose of describing those particular embodiments and implementations only, and are not intended to be limiting, since the scope of the present invention will be limited only by the claims.

The methodology of principal components of data measured on different scales is described below. First, variables and measurement scales are defined because they are fundamental to an understanding of the proposed approach. Second, traditional principal components analysis of variables measured on a continuous scale is described because it provides the general analytical orientation of various embodiments of the invention. Third, principal components analysis of variables measured on multiple scales, categorical and continuous, represents the specific method used to fingerprint data files such as pertain to consumers and businesses according to embodiments of the invention. Fourth, an example is presented using a small set of geodemographic variables from an actual file of this type.

Variables

A variable is defined as a measurable entity that is free to assume any of a prescribed set of values. The data used in modeling are the measured values themselves. A variable that can theoretically assume any of an infinitely large and uncountable range of values between two given values is a continuous variable; a discrete variable can assume a finite range of values, i.e., it can have as many values as there are whole numbers. Spend in dollars; age; audience propensities (e.g., likelihood to buy a particular product); and length of residence are examples of continuous variables, while gender and presence/absence of children are discrete variables.

Measurement is the process of assigning a class or score to an observed phenomenon according to some set of rules. What is not always clear, however, is that measurement does not consist only of processes involving numbers. Phenomena can also be classified into types or ranked relative to one another. An important aspect of measurement is that the observations be made using an operationally defined process that yields reproducible outcomes that are as valid as possible.

The rules used to assign a name or number to a phenomenon determine the level of measurement, with different rules being associated with different levels of measurement. The level of measurement of a variable determines which methods can be used to analyze it and, ultimately, influences the kinds of inferences that can be drawn from studying its distribution. The level of measurement also strongly influences the type of map that can be used to portray the variable's spatial structure. The following four basic levels of measurement are applied herein: nominal, ordinal, interval, and ratio. Each level is more rigorously defined than its predecessor, and each contains more information.

The lowest level is the nominal scale. Values are assigned to distinct categories that label or name the phenomenon. The only requirements are that the categories be inclusive, i.e., all objects must belong to a category; and that they be mutually exclusive, i.e., no object can belong to more than one category. Variables measured on a nominal scale are thus considered to be discrete. For example, gender is coded as male, female, or unknown. Each record possesses one of these properties, but not two or three. The nominal scale makes no assumptions about the ordering of or distance between the categories. A nominal scale places limitations on how the variable can be used in statistical operations and cartographic manipulations. In certain situations, however, the values can be counted to form frequency distributions and, if they are spatially referenced, mathematical operations can be performed on their coordinates.

An ordinal level of measurement exists when there is an implied relationship between the classes and they can be ranked (ordered) consistently according to some criterion. Ordinal scales are asymmetric and transitive. By asymmetric we mean if category A is greater than category B, then B cannot be greater than A. By transitive we mean that if A is greater than B and B is greater than C, then A is greater than C. Variables measured on an ordinal scale are considered to be discrete. As an example, assume male age is recorded on an ordinal scale using the following five categories: 1 (18-24), 2 (25-34), 3 (35-44), 4 (45-54), 5 (55-64), 6(65-74), and 7 (75+). The asymmetric and transitive characteristics of the ordinal scale can be illustrated using this variable. For example, the ranking 2 indicates greater age than ranking 1, and 1 can never indicate greater age than 2; thus the scale is asymmetric. The scale is transitive because ranking 2 indicates greater age than 1, 3 indicates a greater age than 2, and therefore ranking 3 also is greater than ranking 1.

If the categories are ordered and the distances between them are defined using fixed and equal units, the level of measurement is interval. The interval scale lacks a zero point; it can be used to measure differences, therefore, but not absolute magnitude. For example, 80° F. is not twice as hot as 40° F. because 0 on the Fahrenheit scale is an arbitrary point. Only when zero points are established by the phenomena themselves can comparisons such as "twice as many" have any meaning. Variables measured on an interval scale are considered to be continuous.

A ratio scale has the properties of an interval scale but also possesses an inherent zero point. The defining property of such scales is that any two measurements bear the same ratio to each other irrespective of the unit of measurement. For example, if the driving distance from point A to point B is one mile, and the distance from B to point C is two miles, the ratio of AB to BC distances is 1:2 in both cases. Interval and ratio data are usually treated together because they frequently can be manipulated arithmetically and statistically in the same ways.

Although data may have been collected at one level, it is possible and often convenient to convert them into a lower level for analysis or graphic presentation. What is generally not permitted, however, is to treat data collected at a lower scale as if they had been measured at a higher scale. For example, it is easy to convert interval and ratio data into ordinal data, but it is not advisable to sum ordinal scores. This has been the fundamental difficulty in applying PCA to data sets with variables measured on mixed scales. If one had obtained retail spend in dollars, they could easily be converted to an ordinal scale of measurement by establishing cut points on the original scale. For example, zero could be assigned a ranking of 1, values lying between 2 and 100 could be assigned a rank of 2, values of 101-200 could be given a ranking of 3, and values of 201-300 could be assigned rank 4, and so on.

In addition to the property of the level of measurement, most variables also have the property of dimensionality. In a data set we want the variables to be measures of dimensions that are independent, or orthogonal to one another in a correlation sense. Ideally, a variable is a measure of only one theoretical dimension; in practice that is usually not the case. In most datasets, correlations of various strengths exist among variables. For example, income is generally correlated with age, level of education, home value, net worth, length of residence, home ownership, length of residence, and geographic factors ranging in scale from neighborhood to city and state. The real world is not necessarily orthogonal.

When a dataset contains variables that measure the same dimension, there is the possibility that they will be significantly inter-correlated (i.e., they exhibit multicollinearity). These correlative relationships, and how they differ among datasets, are what we exploit in establishing a content-based zero watermark as described herein. Statistical techniques as principal components or factor analysis can be used to reduce the information contained in many variables to a few composite variables, and not all of the original variables need to be considered. In this sense it introduces an exact economy of description.

Principal Components and Factor Analyses of Continuous Variables

In many analytical situations, measurements are made on a set of interval- and ratio-scale variables for each record. Usually these variables measure some aspect of geo-demographic or psychographic variability. Ideally, each variable represents just one dimension of variability, and this is one of the assumptions of such statistical procedures as multiple regression, logistic regression, and discriminant function analysis. Unfortunately, variables are not always uncorrelated with one another, meaning that one variable's values may be partially a function of another variable. Principal components analysis is a data-transformation technique that can be employed to create a new set of variables that are linear combinations of the original variables. The original data are transformed so that the same amount of variability is described using the same number of variables but in such a way that:

1. The first axis (linear combination of the original variables) accounts for as much of the total variance as possible;
2. The second axis accounts for as much of the remaining variance as possible while being uncorrelated with the first; and
3. The third axis accounts for as much of the remaining variance as possible while being uncorrelated with the first two, and so on.

When significant correlations are present among a set of variables, normally a few axes—or principal components—account for a substantial percentage of the total variance while a larger number of axes account for smaller amounts of variance. The small axes accounting for only small amounts of variance are normally discarded from further analysis. Thus, the investigator has transformed an initial data set of p correlated variables into a data set of m uncorrelated variables that explain most of the variance, with m normally being much smaller than p.

The creation of this new set of variables, or "principal components," has several advantages. The first is that the variables are not correlated with one another, that is, each one measures a separate dimension of variability. This is one way of meeting the predictive modeling assumption that no significant linear relationships exist among the independent variables. The second advantage of principal components is that a large amount of variance in the original data set is explained by a smaller set of variables, introducing a parsimony that is normally desirable in any scientific analysis. By examining the relationships between the original variables and the principal components, it is frequently possible to interpret the meaning of the principal components in terms of the original variables.

The focus of interest when PCA is used as a data transformation technique, however, is on the scores exhibited by the individual records on the principal components. Each case, such as an individual, will have a score on each of the principal components defining some aspect of variability among the original variables. These scores can be used in subsequent statistical analyses in lieu of the values for the original variables. As many principal components are needed as there are variables in order to reproduce the inter-correlations among all of the original variables. If the principal components accounting for relatively small amounts of variance are eliminated, a more parsimonious description of the original data has been obtained, but it has been obtained at the expense of possibly losing the ability to reproduce the inter-correlations among the original variables. It should also be noted that PCA makes use of all the information about every variable, though it may be that some of the variation in an observations scores on a given variable is unique and attributable to things that have nothing to do with other variables in the set.

When this unique variance is eliminated from the analysis, we might be able to provide a better explanation of the relationships among the variables. In principal components analysis the new linear combinations of variables that are produced are uncorrelated with one another, and each successive principal component accounts for less variance than its predecessors. If the investigator suspects that the true factors determining the structure of the data are all of about equal importance, then the technique of factor analysis may be more appropriate than PCA. It must be mentioned, however, that many authors regard principal components analysis as a form of factor analysis and frequently use it as a first step in such a study.

The term factor analysis refers to a family of techniques that correct for one or more of the shortcomings of principal components analysis. Common to all factor models is the explicit separation of unique variance from variance held in common among variables and the assumption that the observed correlations among variables are generated by a smaller set of "latent" variables. Depending on one's preconceptions about the nature of the underlying variables, each variable's communality (i.e., percent variance held in common with other variables) may have to be specified in advance. By employing factor analysis instead of principal components analysis, a researcher gains the ability to reproduce the original pattern of inter-correlations among variables from a relatively small number of factors. What is lost is the straightforward relationship of a case's scores on the original variables and its scores on the various factors.

Another loss in almost all forms of factor analysis is the uniqueness of the solution. A given factor structure simply represents a description of the original inter-correlations. Unless additional constraints are imposed, the correlation pattern can be described by any other frame of reference employing the same number of factors. Most factor analysis methods employ some type of arbitrary constraint to obtain a preliminary factor structure, and then rotate the frame of reference until a factor solution is found that comes close to some pre-specified set of criteria. In many predictive modeling situations in which we simply desire a straightforward transformation of the data into a new set of uncorrelated variables, PCA adequately accomplishes this task. More sophisticated types of factor analysis are usually appropriate when a researcher is interested in obtaining a better explanation of the relationships among a set of variables. Whatever the case, factor analysis is a complex form of multivariate statistics that should be used cautiously and with understanding. Given this relationship between principal component and factor analysis, we focus on the former in the present invention as it is a more direct transformation of the original data.

Principal Components Analysis of Mixed Data

Most marketing datasets contain variables measured on multiple scales. At individual and household levels they measure geographic, demographic, socioeconomic and psychographic variables. While all measurement scales are represented, the majority of variables are categorical. In this example we use a small dataset to demonstrate the process of performing PCA on data representing multiple measurement scales (referred to herein as a PCAmix function). The analysis uses the PCAmix function for PCA of mixed data that has become available in the R statistical system (www.r-project.org). It includes standard principal components analysis and MCA (multiple correspondence analysis) functionality.

The PCAmix method consists of the following three steps:
1. process data;
2. perform a Generalized Singular Value Decomposition (GSVD); and 3. create the scores for each observation on the principal components.

The following example shown in Table 1 illustrates how PCA works by applying to one dataset. The same procedure can be applied to multiple datasets, but it is illustrated with a small sample dataset. As part of the first step we select several variables from a larger data provider dataset for use in this analytical example. The first line item in the table below is an abbreviated form of the label (third item on each line) associated with the actual variable name (second item on each line). The abbreviated form is used in the analyses and for plots, because the actual variable name (e.g. IB7602) is fairly information free and the label per se is too long. Several matrices are then created for use in the GSVD step.

TABLE 1

PSX, IB1270 Personicx Clusters (Personicx clusters range from 1-70, and it is a multiple discrete categorical (mdc) variable).
Gender, CDI Gender - mdc variable with values of male, female, and unknown.
NumChild, IB7602 Number of Children - an integer variable.
HOR, IB7606 Home Owner/Renter - a binary variable.
LOR, IB7607 LOR - LOR - length of residence in years is an integer variable.
Marriage, IB7609 Marital Status - Single or married.
PChild, IB7622 Presence of Children - Yes or No.
PAdult, IB7628 Adults in household (HH) - Yes or No.
HHInc, IB7641 HH Income - Ordinal scaled categorical variable.
Ed1, IB7650 Education First Individual - Multiple discrete categories.
HMVd, IB8463 Home Market Value Deciles - Ordinal scaled with ten categories.

This is one data set; each observation is an individual and the columns are variables. The first variable (column) is Conslink, a unique individual identifier. The dataset contains a mix of categorical and numeric variables. Think of it as partitioned horizontally (side by side) into two, a numeric matrix $X_1$ of n rows and $p_1$ columns (shown in Table 2 below) and a categorical matrix $X_2$ of n rows and $p_2$ columns (shown in Table 3 below), where "NA" indicates a missing value:

TABLE 2

| Conslink | NumChild | LOR | PAdult | HHInc | HMVd |
|---|---|---|---|---|---|
| 149295 | 1 | 15 | 1 | 6 | NA |
| 327255 | 2 | 15 | 3 | 4 | 9 |
| 634499 | 0 | 7 | 1 | 5 | 9 |
| 47527 | 1 | 0 | 2 | 4 | NA |
| 1366032 | 0 | 1 | 1 | 3 | NA |
| 1309595 | 0 | 4 | 1 | 4 | NA |

TABLE 3

| ConsLink | Gender | HOR | Marriage | PChild | Ed1 |
|---|---|---|---|---|---|
| 149295 | F | O | S | Y | 1 |
| 327255 | F | O | S | Y | 1 |
| 634499 | M | R | S | N | 1 |
| 47527 | M | O | M | Y | 1 |
| 1366032 | F | R | B | N | 2 |
| 1309595 | F | R | S | N | 1 |

Let m be the total number of categories in $X_2$. Processing then proceeds as follows.

Step 1

Build numerical data matrix $Z=(Z_1|Z_2)$ of dimension n rows x($p_1$+m) columns, where
$Z_1$=standardized version of $X_1$
$Z_2$=centered indicator matrix of levels of $X_2$ Construct a diagonal matrix N of the row weights, where n rows are weighted 1/n.

Build a diagonal matrix M of the column weights, where
The first $p_1$ columns are weighted by 1.
The last m columns are weighted by $n/n_s$, where $n_s$ is the number of observations with level s.
Total variance is $p_1+m-p_2$.

Step 2

The second major step of the PCAmix method involves performing a GSVD (generalized singular value decomposition) of Z with metrics N and M, which gives:

$$Z=UDV^t, \text{ where}$$

$D=\text{diag}(\text{sqrt}(I_1), \ldots, \text{sqrt}(I_r))$ is the r×r diagonal matrix of the singular values of $ZMZ^tN$ and $Z^tNZM$, and r is the rank of Z;
$U=n \times r$ matrix of the first r eigenvectors of $ZMZ^tN$ so that $U^tNU=II_r$;
$V=p \times r$ matrix of the first r eigenvectors of $Z^tNZM$ so that $V^tMV=II_r$.

Each principal component $f_\alpha$ is a linear combination of the columns of $X=(X_1|G)$, where $X_1$ is the numeric data matrix and G is the indicator matrix of the levels of the matrix $X_2$:

$$f_\alpha = \beta_0 + \sum_{j=1}^{p_1+m} \beta_j x_j$$

with:

$$\beta_0 = -\sum_{k=1}^{p_1} v_{k\alpha} \frac{\bar{x}_k}{s_k} - \sum_{k=p_1+1}^{p_1+m} v_{k\alpha},$$

$$\beta_j = v_{j\alpha} \frac{1}{s_j}, \text{ for } j=1,\ldots,p_1$$

$$\beta_j = v_{j\alpha} \frac{n}{n_j}, \text{ for } j=p_1+1,\ldots,p_1+m$$

Table 4 gives the eigenvalues associated with each dimension (eigenvector), the proportion of variance in the dataset explained by the eigenvector, and the cumulative variance explained by the eigenvectors.

TABLE 4

| | Eigenvalue | Proportion | Cumulative |
|---|---|---|---|
| dim 1 | 2.7908625 | 18.605750 | 18.60575 |
| dim 2 | 1.6227697 | 10.818464 | 29.42421 |
| dim 3 | 1.3653974 | 9.102649 | 38.52686 |
| dim 4 | 1.1295416 | 7.530277 | 46.05714 |
| dim 5 | 1.0959792 | 7.306528 | 53.36367 |
| dim 6 | 1.0050003 | 6.700002 | 60.06367 |
| dim 7 | 0.9692432 | 6.461621 | 66.52529 |
| dim 8 | 0.9245095 | 6.163397 | 72.68869 |
| dim 9 | 0.8787180 | 5.858120 | 78.54681 |
| dim 10 | 0.7980640 | 5.320426 | 83.86724 |
| dim 11 | 0.7117901 | 4.745267 | 88.61250 |
| dim 12 | 0.6646513 | 4.431009 | 93.04351 |
| dim 13 | 0.4662211 | 3.108141 | 96.15165 |
| dim 14 | 0.4162375 | 2.774917 | 98.92657 |
| dim 15 | 0.1610147 | 1.073431 | 100.00000 |

It may be seen that Table 4 shows the first eigenvector, or dimension of variability, accounts for almost one-fifth of the variance, the second accounts for over ten percent, and so on. These two eigenvectors alone account for almost a third of the variance in the dataset. This indicates that a reduced set of principal components can be used to provide a parsimonious, compact representation of the dataset, essentially a compressed signature. In various embodiments, only those eigenvectors are retained that account for a significant portion of the variance. In various embodiments, a "significant" portion may be over 10%, over 25%, or greater values. These 15 principal components (dimensions) are shown graphically in FIG. 1.

Step 3

Figure 2:
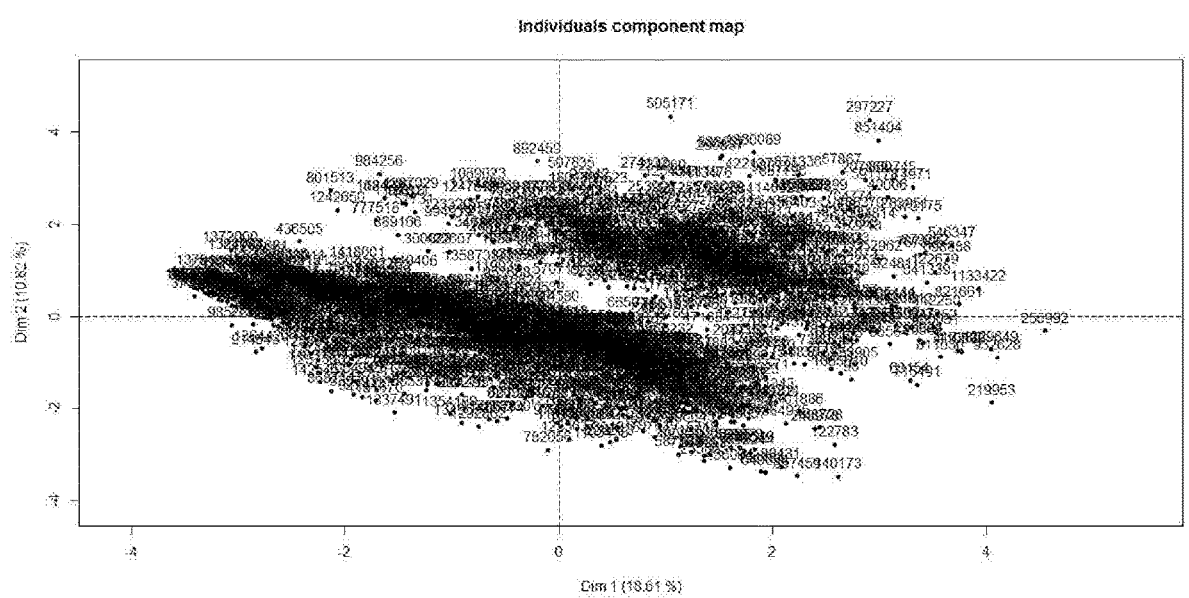
FIG. 2 is a scatter chart depicting the distribution of individual observations by their scores on the first two dimensions of variability (i.e., the first two principal components) according to an embodiment of the invention; the two distinct clouds of points represent two groups of individuals as defined by the qualities of the first two eigenvectors that represent about a third of the variance in the dataset.

The third major step in the PCAmix method involves computation of factor scores for rows and columns. The set of factor scores for rows is F=UD. These are also known as Principal Component Scores. The set of factor scores for columns is A=MVD. In standard PCA, A=VD. Scores for the first six observations for principal components 1 to 4 are shown in Table 5, and the first two dimensions (i.e., principal components 1 and 2) are scatter plotted in FIG. 2.

TABLE 5

| Conslink | dim1 | dim2 | dim3 | dim4 |
| --- | --- | --- | --- | --- |
| 149295 | 0.2811153 | 0.99517700 | −0.2240577 | 1.71594393 |
| 327255 | 0.6654957 | 1.98284519 | −1.0560220 | 1.29209954 |
| 634499 | −1.1809670 | 0.30890928 | −0.5203351 | 0.08541324 |
| 47527 | 0.5989249 | 1.02365372 | 0.5677307 | −0.77135006 |
| 1366032 | −1.6328846 | −0.03020518 | 1.0278012 | −0.83681967 |
| 1309595 | −1.3825687 | 0.23005104 | 0.1123049 | 1.09390389 |

The contribution of $c_{ja}$ of a variable j to the component a is:

$$c_{ja}=aja^2=\text{squared correlation if variable } j \text{ is numeric,}$$
and $$c_{ja}=\text{sum } sl_j(n/n_s)(a_{sa}^2)=\text{correlation ratio if variable } j \text{ is categorical.}$$

Table 6 below gives the non-standard loadings (correlations) between five original variables and principal components 1-4. For example, IB7602, Number of Children, is most highly correlated with dim2, to a lesser extent with dim1, slightly with dim3, but does not co-vary with dim4.

TABLE 6

| | dim1 | dim2 | dim3 | dim4 |
| --- | --- | --- | --- | --- |
| NumChild | 0.5831015 | 0.6746586 | 0.2870474 | −0.01244298 |
| LOR | 0.3646613 | −0.1724569 | −0.5248930 | 0.06717240 |
| PAdult | 0.6635021 | −0.1521005 | −0.2343606 | −0.18794298 |
| HHInc | 0.5018372 | −0.4346122 | 0.3609089 | 0.11281079 |
| HMVd | −0.2310834 | 0.4105398 | −0.5024928 | −0.03638025 |

Figure 3:
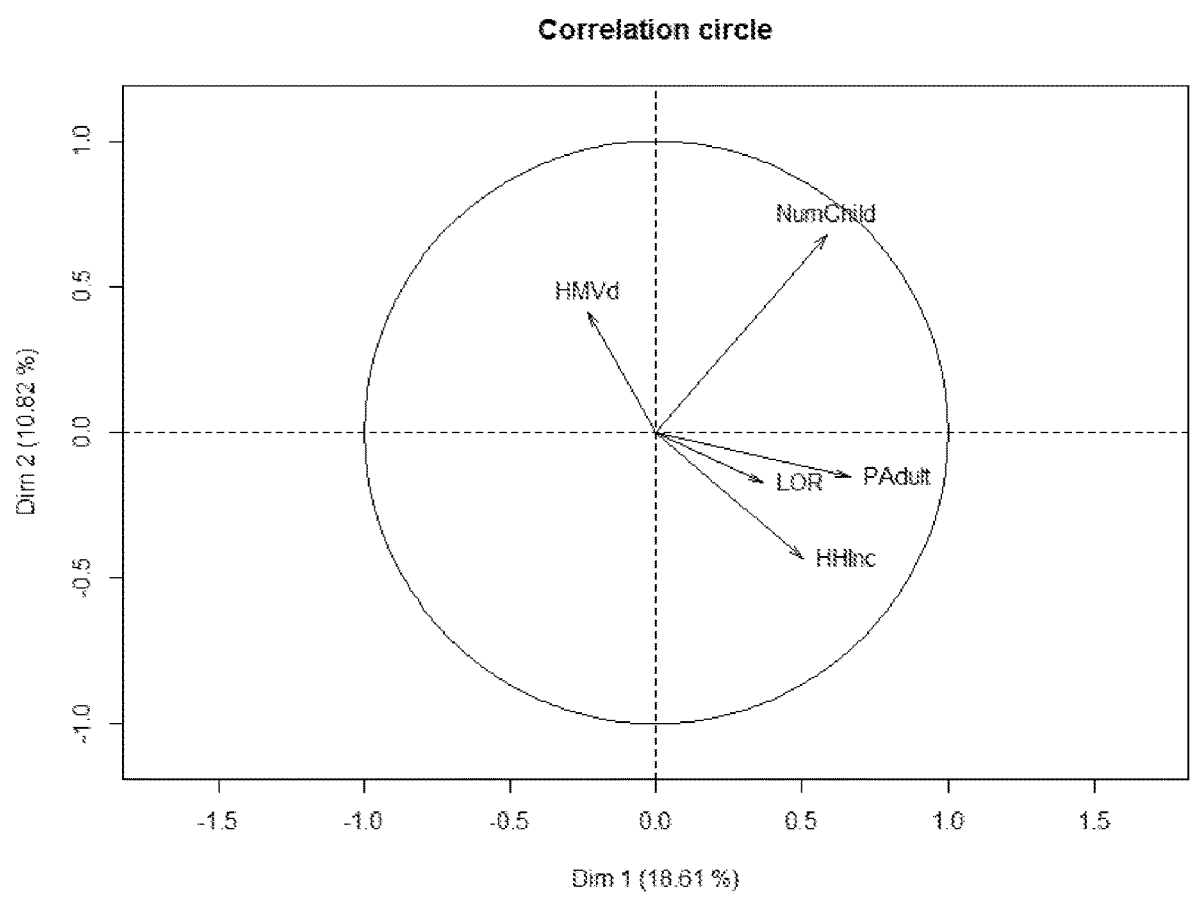
FIG. 3 is a vector plot depicting the transformed set of data provider dataset variables projected into the two-dimensional plane of the analysis according to an embodiment of the invention; longer vectors show the variables that better fit (i.e., are more highly correlated with) the two-dimensional model, while shorter vectors show variables that do not fit the two-dimensional model as well.

The correlations of the first two principal components are shown in FIG. 3. The PCA bi-plot shows the transformed set of data provider dataset variables projected into the two-dimensional plane of the analysis. Longer vectors show the variables that better fit (i.e., are more highly correlated with) the two-dimensional model. A larger component of them is in the plane of the plot. In contrast, shorter vectors show the variables that do not fit the two-dimensional model as well. They tend to be located less in and farther away from the plot; hence their projection into the plot is shorter. The results show, for example, that IB7602, Number of Children, is well represented by the first two eigenvectors. In contrast, IB8463, Home Market Value Deciles, is not that well represented (correlated with) in the first two eigenvectors. The shorter vector length and its relationship to the other variables in the upper and lower right quadrants indicate it is better represented by a higher order dimension. In fact, Table 6 shows IB8463 is most highly correlated with dim3.

Table 7 provides squared loadings for some variables for the first four dimensions, or principal components. The elements of this matrix are simply the squares of their respective values in Table 6.

TABLE 7

| | dim1 | dim2 | dim3 | dim4 |
| --- | --- | --- | --- | --- |
| NumChild | 0.34000740 | 0.45516422 | 0.082396203 | 0.0001548279 |
| LOR | 0.13297787 | 0.02974137 | 0.275512619 | 0.0045121320 |
| PAdult | 0.44023510 | 0.02313455 | 0.054924900 | 0.0353225642 |
| HHInc | 0.25184054 | 0.18888781 | 0.130255225 | 0.0127262748 |
| HMVd | 0.05339955 | 0.16854292 | 0.252498991 | 0.0013235223 |
| Gender | 0.06835595 | 0.01748093 | 0.007264763 | 0.3728025883 |

Figure 4:
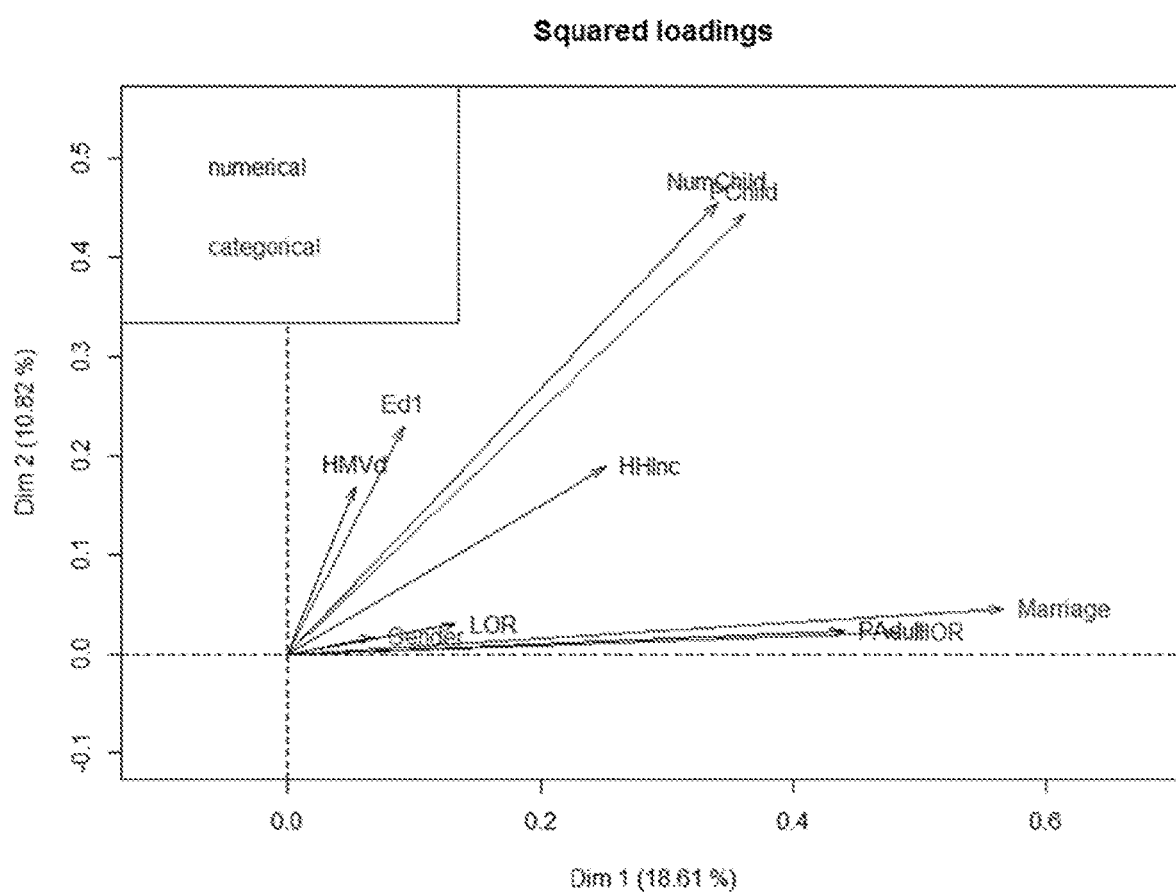
FIG. 4 is a graph depicting squared loadings for a qualitative variable as the correlation ratios between the variable and the principal component according to an embodiment of the invention.

The loadings for the first two dimensions as shown in Table 7 are plotted in FIG. 4. Squared loadings for a qualitative variable are the correlation ratios between the variable and the principal component. For quantitative (numerical) variables they are the squared correlations between the variables and the principal components. For example, IB7622, Presence of Children, is strongly correlated with the first two principal components. IB7609, Marital Status, is highly correlated with the first principal component and almost orthogonal (uncorrelated) to the second principal component. IB7628, Adults in Household, is even more orthogonal to the second principal component and highly correlated with the first.

Figure 5:
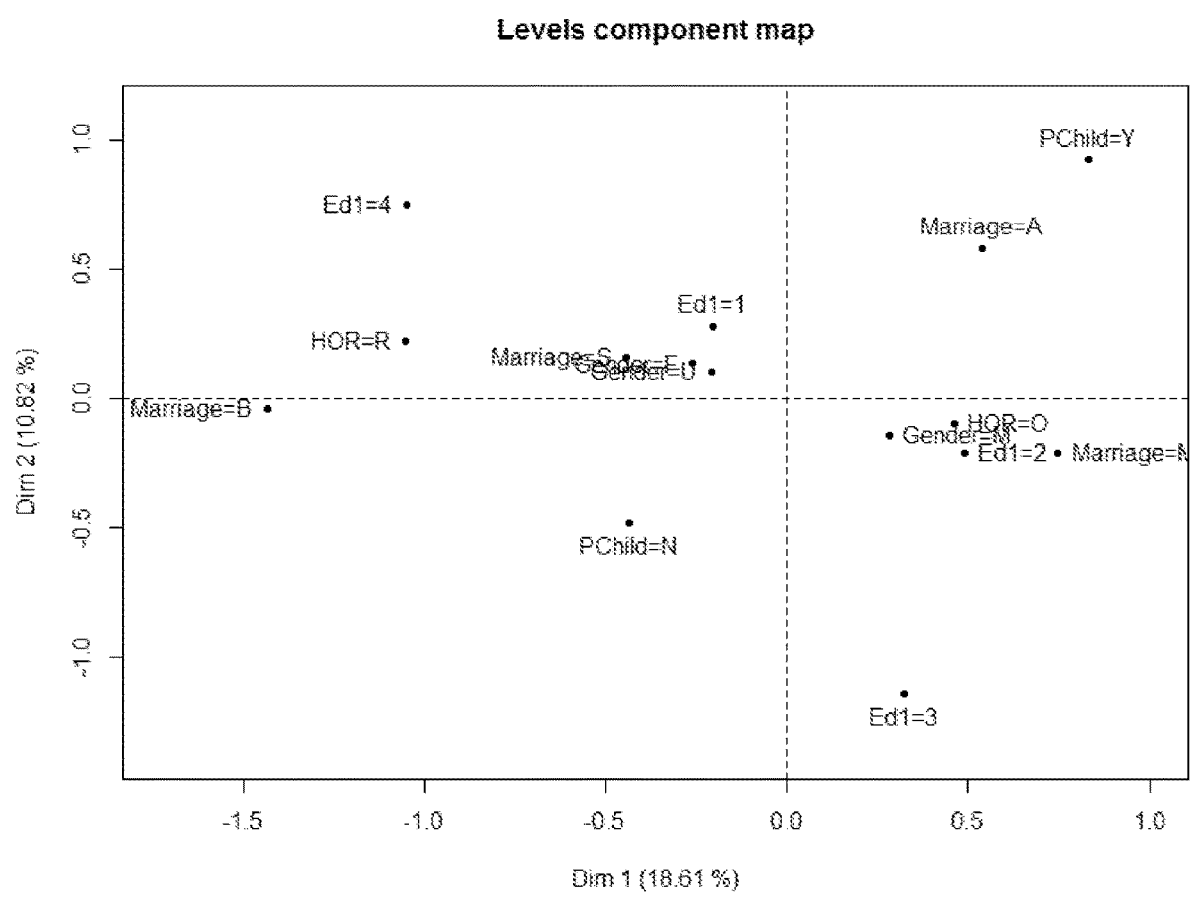
FIG. 5 is a graph depicting the mapping of qualitative variables of the first two orthogonal dimensions of variability according to an embodiment of the invention.

FIG. 5 provides a mapping of qualitative variables to the first two orthogonal dimensions of variability. For example, in the upper right quadrant, IB7622=Y, Presence of Children=Yes, maps closely to 1137609=A, marital status=A, which is married. In the far upper left quadrant, Home Owner/Renter=Renter, maps most closely to Marriage=B, which is Single, and Education=4, Post High School Vocational/Technical training. Similar inferences can be made for levels of other qualitative variables. Table 8 below shows values of levels of qualitative variables with respect to the first four eigenvectors. The values for the first two dimensions correspond to the coordinates on the plot of FIG. 5.

TABLE 8

| | dim1 | dim2 | dim3 | dim4 |
| --- | --- | --- | --- | --- |
| Gender = F | −0.2592116 | 0.13320564 | −0.02365300 | 0.82215925 |
| Gender = M | 0.2821125 | −0.14247873 | 0.07930377 | −0.33899618 |
| Gender = U | −0.2087874 | 0.10132594 | −0.14713260 | −0.66686053 |
| HOR = O | 0.4607747 | −0.09694936 | −0.19084646 | 0.12312380 |
| HOR = R | −1.0525953 | 0.22147146 | 0.43597035 | −0.28126445 |
| Marriage = A | 0.5400801 | 0.57909280 | 0.96184646 | 0.60376766 |
| Marriage = B | −1.4341776 | −0.04043296 | 0.96045929 | −1.35315343 |
| Marriage = M | 0.7474240 | −0.20941840 | −0.18153024 | −0.45004636 |
| Marriage = S | −0.4410118 | 0.15791306 | −0.19404762 | 0.76701993 |
| PChild = N | −0.4343874 | −0.48123740 | −0.20020510 | −0.03067524 |
| PChild = Y | 0.8325021 | 0.92229000 | 0.38369247 | 0.05878901 |
| Ed1 = 1 | −0.2042355 | 0.27900354 | −0.16986221 | −0.11333096 |
| Ed1 = 2 | 0.4885026 | −0.21084180 | −0.22164898 | −0.09263792 |
| Ed1 = 3 | 0.3222649 | −1.13866457 | 1.22505187 | 0.65859778 |
| Ed1 = 4 | −1.0488764 | 0.75021290 | 0.29330773 | 4.66561440 |

Application of PCAmix to Identify Similarities of Datasets

Figure 6:
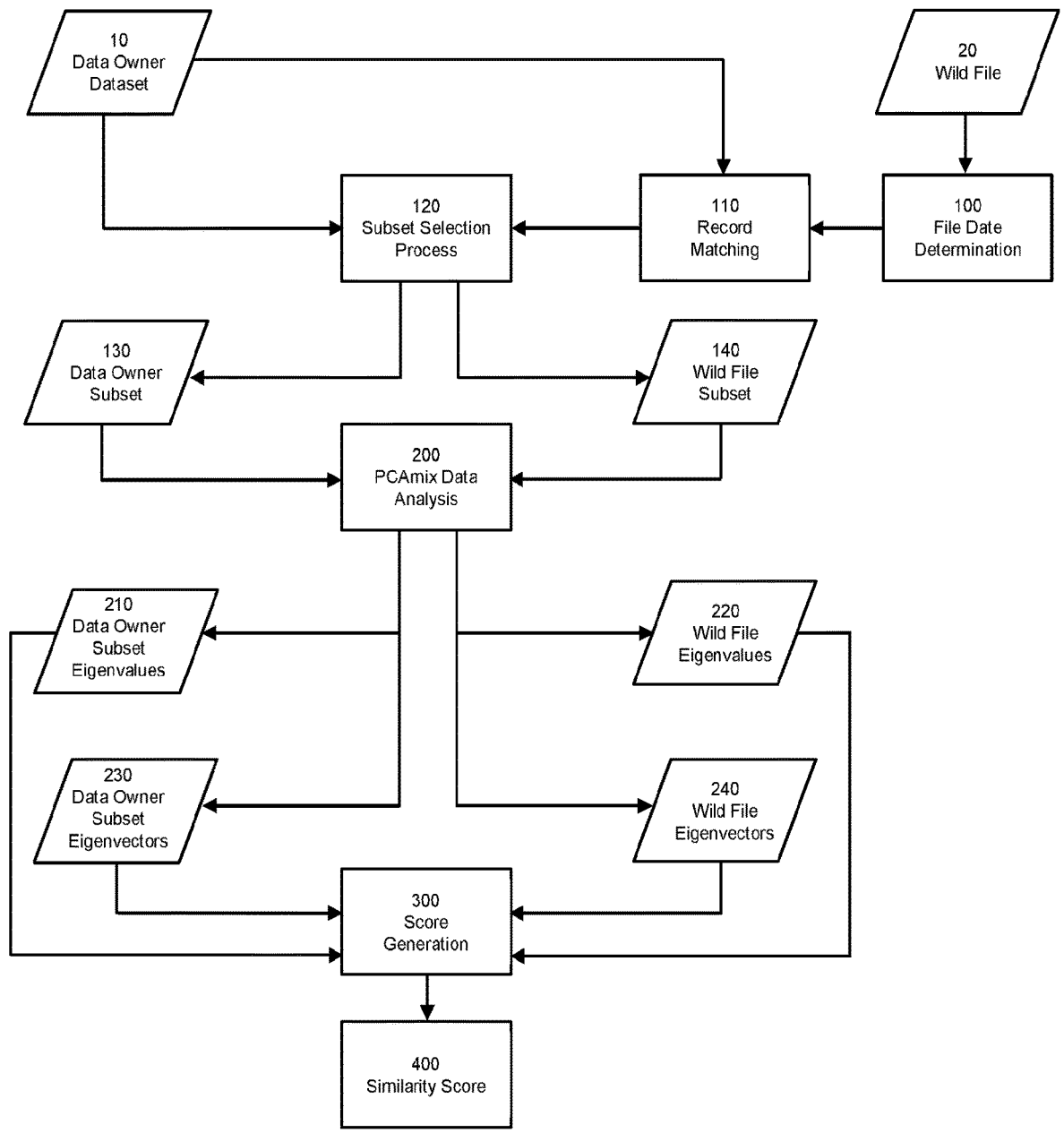
FIG. 6 is a data flow diagram depicting similarity analysis and scoring between two datasets using PCA mix dataflow according to an embodiment of the invention.

FIG. 6 is a data flow diagram depicting the application of the PCA system and method described in the previous section to identify similarity between two datasets. Four main subroutines are employed to perform this calculation: the record matching subroutine 110; the subset selection process routine 120; the PCAmix data analysis subroutine 200; and the score generation subroutine 300. While the illustrated example only compares two data sets, the mechanic can be applied to multiple data sets, potentially in parallel on multiple processors or multiprocessor systems in order to further increase computational efficiency. In a parallel processing environment, the Wild File may be compared to multiple Data Owner Datasets simultaneously as the subroutines are run along parallel threads, potentially as many threads as there are Data Owner Datasets to which the Wild File is being compared to determine if there is a match.

Inputs to the system are Data Owner Dataset 10 and Wild File 20. At file date determination step 100 the Wild File 20 is subjected to change date of birth (DOB) fingerprinting to determine the year and month to which it dates. A process for performing this step is disclosed in international patent application no. PCT/US2017/017007, entitled "Change Fingerprinting for Database Tables, Text Files, and Data Feeds," which is incorporated herein by reference in its entirety. The purpose for this step is twofold. First, it may reduce the universe of possible Data Owner Datasets that may match by limiting this universe to only those that match the date that is determined at file date determination step 100. Second, it may adjust dates in the Wild File 20 so that they match the current dates in potentially matching Data Owner Datasets; these dates can be off due to the passage of time since the Wild File 20 was leaked, which could result in a false negative matching result if the Wild File 20 were simply fed into the system without adjusting dates at file date determination step 100.

At subroutine 110, Record Matching, the individual records in Wild File 20 are matched to Data Owner Dataset 10 for the month/year identified in step 100. This determines the Data Owner Data subset that can be selected for the subsequent analysis. Moving to subroutine 120, Subset Selection Process, a reduced set of variables is selected for each of the datasets, likely the most important ones or those that are required to match a set of variables from Wild File 20. The most important variables are those with high fill rates (low missing values) that are present on many orders. Examples of high fill rate data fields may include, for example, first and last name, address, and marital status. Alternatively, the variables selected from the Data Owner Dataset 10 may be dictated by those that are also present in Wild File 20. A small sample of observations is then selected, because a smaller subset is sufficient to represent hundreds of millions of observations. A one percent random sample of Data Owner Dataset 10 is sufficient to define the covariance structure. The result is Data Owner Subset 130 and Wild File Subset 140.

At subroutine 200, PCAmix data analysis, PCA is performed. The technical details of the calculations performed at PCAMix data analysis subroutine 200 are provided above with respect to the production of eigenvalues and eigenvectors from the data subsets. The vector of eigenvalues is produced for Data Owner Subset 130 and Wild File Subset 140 as Data Owner Subset Eigenvalues 210 and Wild File Subset Eigenvalues 220, respectively. This gives the eigenvalue, the amount of variance explained by the associated eigenvector, and the cumulative variance explained. If there are correlations among the original variables, the eigenvalues will show that a reduced set of eigenvectors accounts for most of the variance in the data set, while those accounting for minor amounts of variance can be discarded or ignored for purposes of subsequent analyses. The eigenvector matrix is produced for the Data Owner Subset 130 and Wild File Subset 140 as Data Owner Subset Eigenvectors 230 and Wild File Eigenvectors 240, respectively. These matrices are a compressed signature for the dataset, or rather, the subset of variables it is based on. There are as many eigenvectors as there are original variables. Each eigenvector is a vector with elements that are weights of the original variables. The weights indicate the importance of particular variables in different eigenvectors. If the datasets are identical, the eigenvector matrices will be identical. If they are not identical, the two eigenvector matrices will differ.

At subroutine 300, Score Generation, the matrix of eigenvector scores is produced for the Data Owner Subset 130 and Wild File Subset 140. Just as each observation has values for the original variables, they also have a score for each one of the eigenvectors. Similarity score 400 is the output from the comparison of eigenvalues from the Data Owner Subset 130 and Wild File Subset 140. If both analyses have been performed on the same observations and variables, the eigenvalues should be more or less identical if the files are the same. If not, it suggests the results may be based on different individuals (observations) and variables. In addition, both eigenvectors are compared. If both analyses have been performed on the same observations and variables, the eigenvectors should be identical. If based on different subsets of observations but the same variables, the most important eigenvectors (i.e., those accounting for the most variance) should be highly similar. If the analysis is based on the same individuals and the same variables, and some of the elements in particular eigenvectors differ, this suggests that some of the fields may be derived from a different source. For common sets of individuals, the correlation of principal components scores between the Data Owner Subset 130 and Wild File Subset 140 should be 1.00 or close to it if the files are one and the same. That is, the correlation between principal component 1 of the Data Owner Subset 130 and Wild File Subset 140 should be 1, the correlation between principal component 2 of the Data Owner Subset 130 and Wild File Subset 140 should be 1, and so on for the remainder of the most important principal components. If not 1 or very close to it, they should not exhibit statistically significant differences. If Data Owner Subset 130 has large representative files from other data owners, a Wild File can be matched to each one of them using the PCAmix procedure described above. As also noted above, this processing may be performed in parallel for as many parallel processing threads are available in the system.

Although the process of FIG. 6 is shown in a configuration intended to produce fingerprints from both a data owner dataset 10 and a wild file 20 and then determine if there is a match between them, the process may be slightly altered in order to simply provide a fingerprint for data owner dataset 10. In this configuration, Wild File 20 is not used, and thus file date determination 100 and record matching 110 are not a part of the processing. Subset selection process subroutine 120 receives data owner dataset 10 as its only input and produces only data owner subset 130. PCAmix Data Analysis subroutine 130 receives only data owner subset 130 as its input, and produces only data owner subset eigenvalues 210 and data owner subset eigenvalues 230. Score generation subroutine 300 is skipped, since there is no meaningful way to calculate a score for a single file, only a comparison between two files. It may be desirable to perform fingerprinting of data owner datasets 10 in this manner offline or prior to any comparisons being performed with Wild File 20, as a way to further speed up the necessary computations once a Wild File 20 is presented for investigation.

Figure 7:
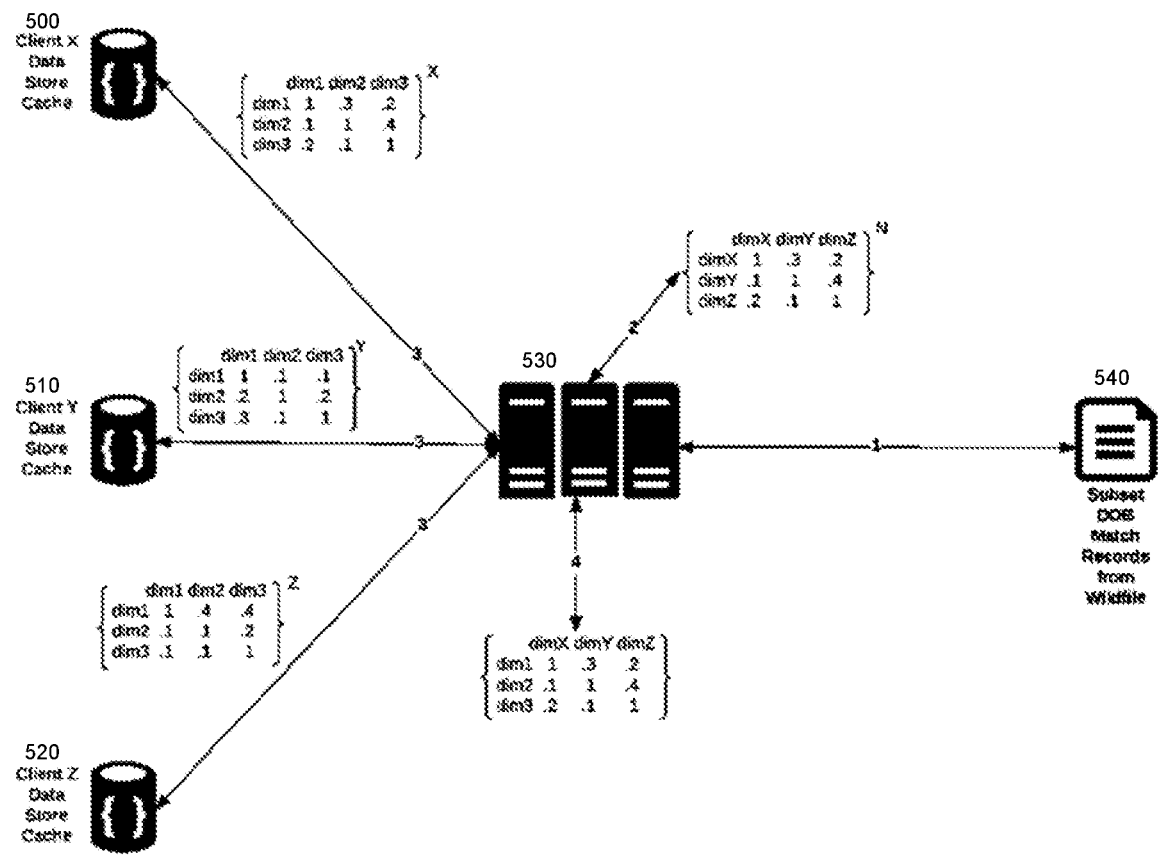
FIG. 7 is an infrastructure and architectural diagram of a PCA fingerprinting system according to an embodiment of the invention.

Turning to FIG. 7, a hardware system for implementing the data flow of FIG. 6 is shown. A subset 540 of DOB match records from the Wild File (corresponding to Wild File Subset 140 of FIG. 6) is input to the servers 530 that perform the analysis described herein. In this example, the Wild File 20 is being compared to datasets from only three potential sources, X-Z, corresponding to Client X Data Store Cache 500, Client Y Data Store Cache 510, and Client Z Data Store Cache 520. It should be noted, however, that the system may be capable of performing comparisons against any number of Data Owner Datasets 10, and in a practical example there may be hundreds or even thousands of such comparisons. Eigenvectors for each comparison are calculated as described above, and the result for each of the three clients is a score indicative of whether the Wild File 20 was derived from the data maintained by each particular client. If the score for a particular Data Owner Dataset 10 is particularly stronger than for any of the other Data Owner Datasets 10, this is a strong indicator that Wild File 20 was in fact derived from this Data Owner Dataset 10.

It will be understood from the foregoing that implementation of the system and method described herein will result in enormous computational efficiencies as compared to simply comparing in fully a Data Owner Dataset 10 and Wild File 20. First, the method can operate on a sample of the data, even 1% or less of the total data. The efficiencies of scale are understood considering that a typical file used for consumer purposes may have 150 to 350 million different records, each with hundreds or thousands of data fields. Performing any type of multivariate analysis on a file of this size is computationally impractical, because the results could not be achieved in a timeframe that would render the results meaningful. On the other hand, calculating a covariance matrix for a file reduced to 1% of this size means that the computational time is reduced by a factor of $\frac{1}{100}$th. In addition, each of the variables (fields) of the sample from the dataset is not used, and a compressed signature can be created from a well-populated set of the most popular variables. For example, a typical file may have 1500 variables (i.e., fields for each record), but practically these files are sparse matrices. Many of the most commonly selected variables from a file, such as gender, age, income, marital status, home owner/renter, and number of children may be well populated, i.e., they have few missing observations. Other variables, such as those flagging highly focused interests (e.g., knitting, hiking, or a particular sport) may have fill rates of less than 10%, often less than 5%. Creating a signature with 50 variables instead of 1500 variables reduces the consideration set by over 95%. Combined with the reduction from using only a 1% sample of the records available, and given the very small footprint for comparison that results from the PCAmix process, it may be seen that the computational efficiency increases are enormous, allowing the necessary computations to be performed in a commercially feasible timeframe on realistic computing equipment found in a business computing environment. In summary, the application of this process transforms a problem that is, as a practical matter, unsolvable to one that is easily solvable in a business meaningful timeframe.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and sub-combinations possible of the group are intended to be individually included. When a range is stated herein, the range is intended to include all subranges and individual points within the range. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. An apparatus for determining data leakage in data files with mixed data, the apparatus comprising:
   a server configured to receive a wild file, wherein the wild file comprises a plurality of wild file records each comprising a plurality of wild file fields containing mixed data representing multiple measurement scales comprising at least one categorical scale and at least one numeric scale;
   at least one data store cache in communication with the server, wherein the data store cache comprises a data owner dataset comprising a plurality of data owner dataset records each comprising a plurality of data owner dataset fields containing mixed data representing multiple measurement scales comprising at least one categorical scale and at least one numeric scale;
   a subset selection subroutine implemented on the server, wherein the subset selection subroutine is configured to receive a data owner dataset and a date-adjusted wild file and create a data owner subset and a wild file subset, wherein the data owner subset and the wild file subset contain a reduced number of records compared to the data owner dataset and the wild file, respectively;
   a PCAmix data analysis subroutine implemented on the server, wherein the PCAmix data analysis subroutine is configured to receive the data owner subset and the wild file subset, divide the wild file dataset into a horizontally partitioned dataset comprising a numeric matrix and a categorical matrix, and produce a set of data owner subset eigenvalues, a set of data owner subset eigenvectors, a set of wild file subset eigenvalues, and a set of wild file subset eigenvectors;
   a score generation subroutine implemented on the server, wherein the score generation subroutine is configured to receive the data owner subset eigenvalues, the data owner subset eigenvectors, the wild file subset eigenvalues, and the wild file subset eigenvectors to produce a similarity score indicative of the likelihood that the wild file was derived from the data owner dataset; and
   a file date determination subroutine implemented on the server, wherein the file date determination subroutine is configured to analyze the wild file and adjust dates in the wild file to account for a passage of time since the wild file was leaked to produce the date-adjusted wild file.

2. The apparatus of claim 1, further comprising a record matching subroutine implemented on the server, the record matching subroutine configured to receive the date-adjusted wild file and the data owner dataset and produce a set of matched records between the date-adjusted wild file and the data owner dataset.

17

3. The apparatus of claim 1, wherein the PCAmix data analysis subroutine is further configured to build a first diagonal matrix constructed from row weights from the numerical data matrix, and a second diagonal matrix constructed from column weights from the numerical data matrix.

4. The apparatus of claim 3, wherein the PCAmix data analysis subroutine is further configured to perform a generalized singular value decomposition on the numerical data matrix using metrics from the first and second diagonal matrices to produce the data set owner subset eigenvectors and the wild file subset eigenvectors.

5. The apparatus of claim 4, wherein the PCAmix data analysis subroutine is further configured to eliminate all of the data set owner subset eigenvectors and wild file subset eigenvectors other than those that account for a significant portion of variance.

6. The apparatus of claim 5, wherein the PCAmix data analysis subroutine is further configured to eliminate all of the data set owner subset eigenvectors and wild file subset eigenvectors other than those that account for at least ten percent of variance.

7. An apparatus for creating a fingerprint for a data file, the apparatus comprising:
a server;
a data store cache in communication with the server, wherein the data store cache comprises a data owner dataset comprising a plurality of data owner dataset records each comprising a plurality of data owner dataset fields containing mixed data representing multiple measurement scales comprising at least one categorical scale and at least one numeric scale;
a subset selection subroutine implemented on the server, wherein the subset selection subroutine is configured to receive the data owner dataset and create from the data owner dataset a data owner subset, wherein the data owner subset contains a reduced number of records compared to the data owner dataset; and
a PCAmix data analysis subroutine implemented on the server, wherein the PCAmix data analysis subroutine is configured to receive the data owner subset, divide the data owner subset into a horizontally partitioned dataset comprising a numerical data matrix and a categorical matrix, and produce from the horizontally partitioned dataset a set of data owner subset eigenvalues and a set of data owner subset eigenvectors, wherein the PCAmix data analysis subroutine is further configured to build a first diagonal matrix constructed from a set of row weights from the numerical data matrix, and a second diagonal matrix constructed from a set of column weights from the numerical data matrix.

8. The apparatus of claim 7, wherein the PCAmix data analysis subroutine is further configured to perform a generalized singular value decomposition on the numerical data matrix using a set of metrics from the first and second diagonal matrices to produce the data set owner subset eigenvectors.

9. The apparatus of claim 8, wherein the PCAmix data analysis subroutine is further configured to eliminate all of the data set owner subset eigenvectors other than those that account for a significant portion of variance.

10. The apparatus of claim 9, wherein the PCAmix data analysis subroutine is further configured to eliminate all of the data set owner subset eigenvectors other than those that account for at least ten percent of variance.

11. A method for fingerprinting a data owner dataset using a server, wherein the dataset is stored on a data store cache in communication with the server and the dataset comprises a plurality of records each comprising a plurality of fields, the method comprising the steps of:
Selecting, at the server, a subset of the records from the dataset on the data store cache to produce a data owner subset comprising a plurality of data owner dataset records each comprising a plurality of data owner dataset fields containing mixed data representing multiple measurement scales comprising at least one categorical scale and at least one numeric scale;
Applying, at the server, principal components analysis to the data owner subset to divide the data owner dataset into a horizontally partitioned dataset comprising a numeric matrix and a categorical matrix to produce a matrix of data owner subset eigenvalues and a matrix of data owner subset eigenvectors, wherein the step of applying principal components analysis to the data owner subset further comprises the step(s) of
removing, at the server, all of the data owner subset eigenvectors from the matrix of data owner subset eigenvectors other than those that account for a significant portion of variance, and/or
removing, at the server, all of the data owner subset eigenvectors from the matrix of data owner subset eigenvectors other than those that account for at least ten percent of variance; and
analyzing, at the server, the matrix of data owner subset eigenvectors to produce a set of scores that define observational values on the data owner subset; and
storing the set of scores at the server.

12. The method of claim 11, wherein the step of applying principal components analysis to the data owner subset further comprises the step of building at the server a numerical data matrix, a first diagonal matrix constructed from a set of row weights from the numerical data matrix, and a second diagonal matrix constructed from a set of column weights from the numerical data matrix.

13. The method of claim 12, wherein the step of applying principal components analysis to the data owner subset further comprises the step of performing at the server a generalized singular value decomposition on the numerical data matrix using a set of metrics from the first and second diagonal matrices to produce the matrix of data owner subset eigenvectors.

14. A method for determining if a wild file is derived from a data owner dataset, wherein the data owner dataset is stored on a data store cache in communication with a server, and wherein each of the data owner dataset and the wild file comprise a plurality of records each comprising a plurality of fields containing mixed data representing multiple measurement scales comprising at least one categorical scale and at least one numeric scale, the method comprising the steps of, at the server:
extracting a subset of the records from the data owner dataset to produce a data owner subset;
extracting a subset of the records from the wild file corresponding to the records in the data owner subset to produce a wild file subset, wherein
determining a file date for the wild file prior to the step of extracting the subset of the records from the wild file corresponding to the records in the data owner subset;
dividing the data owner dataset into a horizontally partitioned data owner dataset comprising a data owner numeric matrix and a data owner categorical matrix;
applying principal components analysis to the horizontally partitioned data owner subset to produce a set of data owner subset eigenvalues and a matrix of data owner subset eigenvectors;

dividing the wild file subset into a wild file horizontally partitioned subset comprising a wild file numeric matrix and a wild file categorical matrix;

applying principal components analysis to the wild file horizontally partitioned subset to produce a set of wild file subset eigenvalues and a matrix of wild file subset eigenvectors; and analyzing each data owner subset eigenvector relative to a corresponding wild file subset eigenvector to produce a similarity score; and storing the similarity score at the server.

15. The method of claim 14, wherein the step of applying principal components analysis to the data owner horizontally partitioned subset further comprises the step of, at the server, building a first diagonal matrix constructed from row weights from the numerical data matrix, and a second diagonal matrix constructed from column weights from the numerical data matrix.

16. The method of claim 15, wherein the step of applying principal components analysis to the data owner horizontally partitioned subset further comprises the step of, at the server, performing a generalized singular value decomposition on the numerical data matrix using metrics from the first and second diagonal matrices to produce the matrix of data owner subset eigenvectors and the matrix of wild file subset eigenvectors.

17. The method of claim 16, wherein the step of applying principal components analysis to the data owner horizontally partitioned subset further comprises the step of, at the server, eliminating all data owner subset eigenvectors from the matrix of data owner subset eigenvectors and all wild file subset eigenvectors from the matrix of wild file subset eigenvectors other than those that account for a significant portion of variance.

18. The method of claim 16, wherein the step of applying principal components analysis to the data owner subset further comprises the step of, at the server, eliminating all data owner subset eigenvectors from the matrix of data owner subset eigenvectors and all wild file subset eigenvectors from the matrix of wild file subset eigenvectors other than those that account for at least ten percent of variance.

* * * * *